Sept. 19, 1967        R. H. WILLIAMS        3,342,713

HYDRAZINE FROM GASEOUS AMMONIA

Filed April 12, 1963

INVENTOR.
ROBERT H. WILLIAMS

BY *Q. H. Caser*

ATTORNEY 3,342,713
HYDRAZINE FROM GASEOUS AMMONIA
Robert H. Williams, Pennington, N.J., assignor to Mobil Oil Corporation, a corporation of New York
Filed Apr. 12, 1963, Ser. No. 272,577
18 Claims. (Cl. 204—157.1)

This invention relates to a process of producing hydrazine directly from gaseous ammonia.

Currently hydrazine is made by the old Raschig process involving a chemical synthesis from sodium hypochlorite and ammonia which of course does not employ radiation. The intricacies of the process have resulted in hydrazine being a high cost chemical even though ammonia is available at a few cents a pound. Revived interest in the production of hydrazine is occasioned by the discovery that it is a promising liquid fuel for increasing the range and payload capacity of missiles beyond that possible with hydrocarbon fuels.

The direct production of hydrazine from ammonia, with hydrogen as well as hydrazine being produced, has been studied heretofore, using various sources of energy, such as heat and electrical discharges, to carry out the reaction. Efforts have also been made to produce hydrazine from gaseous ammonia by means of nuclear radiation, but no hydrazine product has been observed, although hydrazine is formed when liquid ammonia is irradiated. The liquid phase process however requires temperatures in the subzero range of −34 to −77° C. with attendant engineering cost and difficulties.

As gas phase operation offers obvious conveniences and advantages not possible with liquid phase work, it is an object of this invention to provide a method of converting gaseous ammonia to hydrazine. Briefly, the method comprises irradiating the ammonia with high energy ionizing radiation while it is in contact with a microporous solid material. The solid material is one capable of absorbing radiation energy and of transferring at least a portion of such energy to the ammonia to convert the same to hydrazine. The solid material may have a catalytic effect on the ammonia, which tends to promote the reaction, and it may also adsorb or absorb ammonia and thus make it more prone to chemical change. In addition, the solid material may undergo radiation-induced changes with beneficial enhanced effects on its catalytic activities, or such activities may be induced in the solids as a consequence of being irradiated.

By comparison with the irradiation of liquid ammonia, the present process is not thermally limited by the need to maintain a liquid phase. Any suitable temperature or pressure within the critical limits of the gas may be employed. It is pertinent to point out, when using nuclear radiation or fission recoil energy, that gaseous ammonia, having a lower density of N–14 atoms, will produce far less reactor poisoning, i.e., capture of thermal neutrons by N–14 to form radioactive C–14, than liquid ammonia.

Considering the invention in greater detail, the solid contact material is preferably inorganic and relatively stable, that is, it does not disintegrate as a result of exposure to radiation or of radioactivity occurring therein and is capable of retaining its form and strength under the conditions of use. In general, the material should have a relatively low thermal neutron capture cross-section, below about 10 barns and preferably below 0.5 barn. The material is porous, having a surface area broadly within the range of 5 to 1,500 square meters per gram and preferably 50 to 700 square meters per gram. As is known, these high surface areas are the result of an internal effect, rather than merely the state of subdivision, and more particularly arise from the presence in the solids of numerous pores or micropores. The large surface area tends to favor the creation, during irradiation, of excitation centers and in turn the transfer of energy to gaseous ammonia molecules. Desirably, the excitation centers should have a sufficiently long lifetime, say at least 0.1 microsecond, as to be effective and should be generated at convenient operating temperatures. The solids may have a pore volume within the range of 5 to 70% and preferably 30 to 50%. The pore radii may range from about 4 angstroms to 100 microns. Microporous contact materials are a desirable group, the term "microporous" referring to porous solids having at least 5% of their volume as pores and at least 25% of the total pore volume comprising pores having radii less than about 100 angstroms.

Some specific solids include silica, alumina, silica-alumina, silica-magnesia, oxides of calcium, barium, magnesia, nickel, iron, and the like. Gel-type solids are useful, as obtained by drying hydrated oxides such as alumina, silica, titania, zirconia, magnesia, and zinc aluminate. Also useful are the zeolites, both natural and synthetic, and including those which act as molecular sieves, having pores of uniform and generally very small size, say about 4 to 20 angstroms; examples are chabazite, analcite, faujasite, acadialite, gmelinite, heulandite, natrolite, stilbite, thomsonite, mordenite, and the various Linde synthetic sieves. Ion exchange forms of zeolites are suitable. Other useful solids are siliceous earths such as diatomaceous earth, infusorial earth and kieselguhr; natural clays and clay-like materials such as kaolin and montmorillonite clays, bentonite, Fuller's earth, Superfiltrol, bauxite, and Porocel, a type of clay. Also, porous ceramic materials such as unglazed porcelain; and aluminum silicate selective adsorbents such as calcium aluminum silicate. Other materials are chamotte, asbestos, pumice, talc, activated carbon, bone char, charcoal, graphite, and hydrosilicates, particularly those of aluminum.

Porous or microporous oxides comprise a desirable class of solids as it appears that the micropore-defining walls in these solids tend to acquire energy from the incident radiation and in consequence to have high energy sites formed thereon. Also preferred are basic porous oxides such as magnesium oxide because of the apparently increased ease of deadsorbing the product therefrom.

Another preferred class of porous oxides comprises those which attract and incorporate hydrogen atoms, as by chemisorption, with the result that less destruction of hydrazine, or of its precursor the —$NH_2$ radical, is apt to occur through attack by hydrogen atoms. These hydrogen-attracting solids include zeolites, clays, silica, alumina, aluminosilicates, etc. It may be noted that in the subsequent flushing of these hydrogen-attracting solids to remove adsorbed hydrazine, it is preferred to use non-aqueous flushing agents, although aqueous agents may also be used if, prior to reuse of the solids, they are heated to remove any water.

The particle size of the solids is variable, but an illustrative size is 60 to 200 mesh.

It will be understood that hydrazine-decomposing solids and/or the conditions under which such decomposing action is effective will be avoided. For example, hydrazine is decomposed at 250 to 310° C. when brought into contact with silica, and therefore when silica is used as contact material, such temperatures are to be avoided, or silica is avoided when these temperatures are expected.

High energy ionizing radiation of any kind and from any suitable source may be used to irradiate, provided that it is sufficiently energetic and penetrating as to be able to generate states of excitation in the solids. Such radiation is intended to embrace both ionizing particle radiation and ionizing electromagnetic radiation; the former includes accelerated electrons, nuclear particles like protons, fast neutrons, alpha and beta particles, deutrons, fission fragments, and the like; and the latter includes gamma rays and X-rays. Accelerated electrons, and fission fragments are a convenient and practical radiation. Gamma rays and X-rays are also convenient, particularly in batch processes. The usual precautions will of course be observed, having regard to the different penetrating power of the various types of radiation. In other words, if the radiation is less penetrating than others, it should be brought nearer the solids and/or the depth of the latter reduced, and vice versa.

The foregoing kinds of radiation may be obtained from various sources, including natural radioactive materials, which emit alpha, beta, and gamma radiation; from nuclear fission byproducts of processes in which atomic power is generated, these by-products including elements having atomic numbers ranging from 30 to 63; from materials made radioactive by exposure to neutron radiation, such as cobalt-60, cesium-137, sodium-24, manganese-56, gadolinium-72, lanthanum-140, etc.; or from operating nuclear reactors. The charged particles may be brought to high energy levels by acceleration in conventional devices. For example, high speed electrons having energies of 0.5 to 15 mev. can be supplied by Van de Graaff generators, resonant transformers, linear accelerators, etc. High energy X-ray machines are a source of X-rays.

A practically useful energy level for the foregoing radiation is 1 mev., although the level may range from 0.5 to 15 mev., and more broadly from 1 kev. to 20 or 30 mev. It will be understood that the invention is not dependent on the energy level of the radiation, which may be as low as is effective and as high as desired.

The radiation dose rate is variable, but should be at least sufficient to produce a chemical conversion, and should not, of course, be so high as to destroy the product. A typical range is one hundred to ten thousand megarads/hour, and a more general range is one to one million megarads/hour.

Irradiation can be done at normal temperatures. There is no lower temperature limit, although the upper limit should be chosen to preserve the hydrazine and the lifetime of the states of excitation of the solids. For most solids a safe upper temperature during irradiation is in the range of 100 to 200° C. Pressures may range from those just sufficient to drive the ammonia through the system to any desired greater pressure. Contact times of the ammonia with the solid are generally short, ranging from 0.1 to 5 or 10 seconds, more broadly to 0.5 or 1 minute, and also as long as 5 minutes, although this will also depend on the dose level, rate, distance of the irradiating source from the solids, and possibly other factors. Contact time may be conveniently regulated by control of the pressure, and in any event should be short enough to prevent any appreciable destruction of the hydrazine.

As indicated, the gaseous ammonia is brought into contact with the solids while both are being irradiated, and the solids may be stationary, although preferably they are moved relatively to the incident radiation. More preferably, both the solids and the ammonia gas are moved, and in some cases the beam of radiation may be in motion, all with the thought of preserving the hydrazine product. The ammonia gas receives some of the radiation directly, but a far greater amount is received by or deposited in the solid material, which absorbs substantially all of the remainder of such energy and transfers at least a part to the ammonia to convert the latter to hydrazine. In addition to this effect of energy transfer, some solids may have a conventional catalytic influence on the reaction, favoring the production of hydrazine, and the absorbed radiation may enhance such influence and thus increase the formation of hydrazine. With some non-catalytic solids a radiation-induced catalytic activity may be imparted, i.e., one that is effective during irradiation, and hydrazine formation may take place as a result of such activity. It will be appreciated that one or more of these effects may occur. The resulting hydrazine may pass along with the ammonia stream and be recovered outside of the irradiation area, and/or it may be adsorbed by the solid, at least in part, and removed therefrom at the conclusion of the irradiation. During irradiation, it is well to flush the solids with excess ammonia gas, or with a suitable inert gas, to prevent overlong residence time of any hydrazine adsorbed by the solids. Anhydrous hydrazine may be recovered directly where the flushing or extraction agent is non-aqueous, otherwise it may be recovered by distillation from the aqueous agent.

Contact between the ammonia and the solid may be brought about in a number of ways, as illustrated in the drawings, all of which are diagrammatic, and in which.

Figure 1:
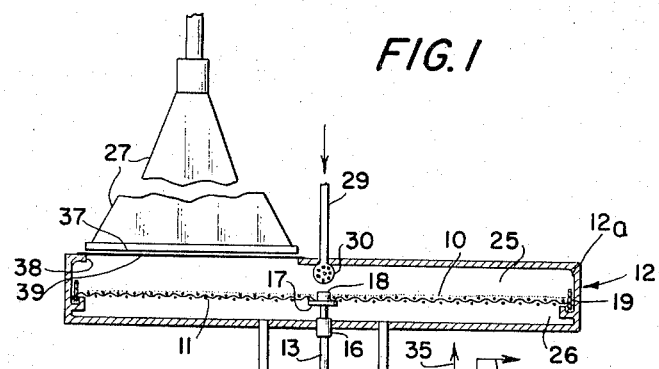
FIG. 1 illustrates a flow system in which a rotating bed of solid material is subjected to bombardment by a scanned beam of electrons.
Figure 3:
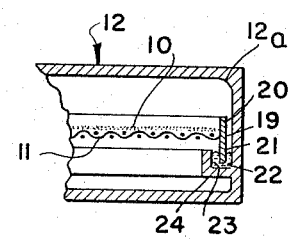
FIG. 3 is an enlarged partial view of one end of FIG. 1 showing the construction in more detail.

In FIG. 1 the solid material 10 is placed on a rotating flanged circular screen 11 disposed in an irradiation zone 12. The screen is rotated slowly by shaft 13 through a conventional belt and pulley arrangement 14, 15 and drive means not shown. Shaft 13 is rotatably held by a suitably supported bearing 16. A plate 17 of suitable dimensions and a hub 18, both attached to shaft 13, help support the screen for rotation. At its periphery the screen is provided with a double flange 19 (FIG. 3), a portion 20 of which extends topside of the screen and a portion 21 of which extends below the screen. The upper flanged portion 20 acts as a barrier to retain solid material on the screen during rotation, while the lower portion 21 forms part of a gas seal by virtue of its partial immersion in a body 22 of mercury or other suitable liquid contained in the annular recess 23 formed by the annular right-angled bracket 24 attached to the side wall of the stationary housing of the zone 12. As shown, the bottom edge of flange 21 is spaced from the bottom of the recess to provide free movement of the same therein. The gas seal compels the ammonia in the upper or inlet chamber 25 to pass through the solids bed to get to the lower or exit chamber 26.

Figure 2:
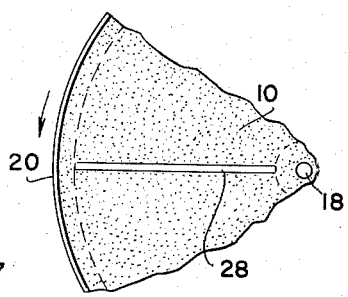
FIG. 2 is a fragmental view, in plan, of the rotating bed of solids of FIG. 1 showing the approximate area of impact of the scanned electron beam on the bed of solids.

A rapidly deflected, or scanned, electron beam inside the scanner chamber 27 of a Van de Graaff accelerator, not shown, bombards the solid bed over a reduced area 28, note FIG. 2, so that consecutive portions of the solid are irradiated. Ammonia gas enters chamber 25 of zone 12 through line 29, is suitably diffused as by diffuser 30, makes contact with the solid while both the gas and solid are being irradiated, then passes through the solid and screen into chamber 26 and leaves the irradiation zone through lines 31. The exit stream passes by line 32 to a separation zone 33 comprising one or more condensation zones and gas collecting devices. Hydrazine may be removed from zone 33 by line 34 while unreacted ammonia in line 35 may be recirculated. Non-condensable gases like nitrogen and hydrogen may be recovered through line 36.

The mouth 37 of the scanning chamber 27 is spaced slightly by an air gap from the irradiation zone 12, as is conventional. Zone 12 is recessed at 38 to permit entry of the beam, the recess being covered by an aluminum window 39 of conventional thinness; that is, the window is strong enough to withstand the gas pressure in chamber 25 but thin enough to avoid absorbing any appreciable amount of the energy of the beam passing through.

An advantage of this flow system is that the hydrazine product may be flushed from the irradiation zone by incoming ammonia before any appreciable portion is decomposed by the electron beam. Chamber 25, and also chamber 26, are of reduced size to facilitate thorough and rapid flushing, and to this end the edges of these chambers may be rounded, as at 12a. As may be apparent, not all of the ammonia that enters chamber 25 is irradiated coincidently with the solids; some, as indicated, serves to flush out product. It will be noted that incoming ammonia has an opportunity to flush the greater part of the rotating bed during the interval that it is not under the beam; and it may also flush that portion of the bed which is actually receiving radiation. Such flushing action, of course, is additional to the contact which the gas makes with the bed while both are being simultaneously irradiated.

Preferably the thickness of the bed of solids is just enough to completely absorb the electron beam, in order to avoid waste of energy. Usually the thickness is of the order of several millimeters. If desired, the bed may be stationary, but preferably is rotated. An unscanned beam of generally circular cross section may also be used, although a scanned beam is preferred because of its more uniform intensity, greater coverage, and shorter processing time. Cooling means in the form of a water-cooled outer jacket (not shown) for zone 12 may be provided to offset the heating effect of the beam on the solids. In some cases, intermittent or on-off operation of the beam may be useful to control any decomposition of product.

In separation zone 33 the ammonia and hydrazine may be separated in any desired way; for example, both may be liquefied and separated from the non-condensable gas, and the ammonia can then be vaporized away from the liquid hydrazine.

If desired, the mouth and lower portion of the scanning chamber 27 may be disposed inside the zone 12, with the mouth 37 immediately adjacent the solids bed thus reducing any tendency of the beam to scatter, although scattering may also be reduced by reducing the height of chamber 25, as has been done.

Slow rotation of the circular bed of solids is preferred to favor diffusion and flushing of the hydrazine through the solids. For example, 1 to 10 cm./sec., more or less, is suitable speed of rotation.

Figure 4:
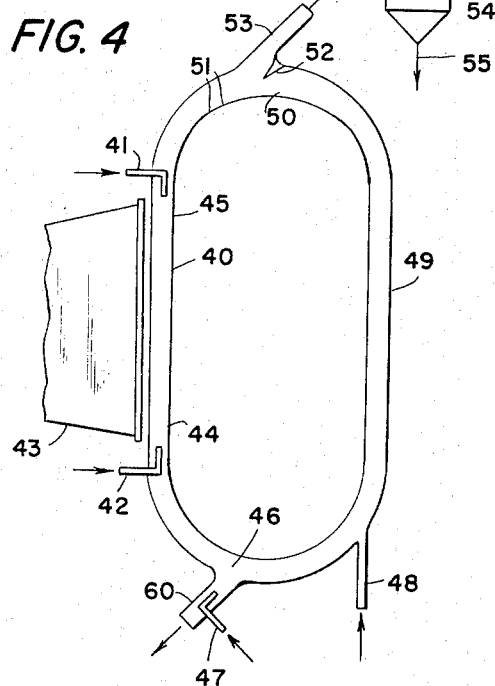
FIG. 4 illustrates a flow system in which the ammonia makes contact with the solids in fluidized form during irradiation.

In FIG. 4 the solid is also in motion, but here it is in subdivided form and is made to flow as a fluid by employing the ammonia or other gas as a fluidizing medium. Solid material, initially introduced to pipe 40 through inlet 41, falls against an upwardly flowing stream of ammonia gas introduced through inlet 42. The speed of descent of the solids through the rising ammonia may be regulated by the ammonia velocity and/or by the particle size of the solids so that the countercurrently flowing mixture of solids and ammonia are in the path of the electron beam from chamber 43 a suitable time. The beam is preferably scanned, emerging from the scanning chamber so that it falls on a length of pipe 44–45, the latter having on the side exposed to the beam a thin window insert (not shown) or a suitably thinned wall of glass or aluminum or other suitable material. During irradiation, conversion of ammonia to hydrazine takes place mainly on the surface of the falling solids as they are contacted by the gas. The solids continue falling, reaching the area at 46 where additional ammonia from inlet 47 picks them up and, with the aid of ammonia introduced as required by inlet 48, lifts them in pipe 49 to the area 50. Flushing of the solids by the ammonia and stripping of hydrazine from them is favored by the lift action in pipe 49. At 50, the pipe 49 enlarges in diameter to such an extent that the lifting action of the lift gas is reduced and the solids drop out of suspension therein on to the downwardly curved surface 51 of the area 50. Solid dropout is further aided by the baffle 52 interposed in the path of flow of the lift gases, and the solids are able to descend in pipe 40 for another cycle. The lift gases continue upwardly through line 53 to a separating system comprising separator 54 where any entrained solids are removed by line 55 and reused, and the gases pass by line 56 to a separator 57 where hydrazine may be removed as a liquid through line 58 and gaseous ammonia removed by line 59 and recycled to lines 42, 47, and/or 48.

At any desired interval, solids may be removed through line 60 by decreasing the flow of ammonia in inlet 47, and the removed solids may be treated as by flushing with a suitable gas to remove hydrazine, or by extraction with a suitable hydrazine solvent. Solids may be removed through line 60 after one, two, or more cycles, and fresh make-up solids added through inlet 41.

Cocurrent flow of the solids and ammonia through the irradiation zone 44–45 is possible, as well as countercurrent flow. For cocurrent flow, both the solids and the ammonia gas may be introduced by inlet 41, and nitrogen or other suitable inert gas by inlet 42. The speed of the downwardly flowing solids and ammonia may be adjusted as desired by regulating the flow through the inlets 41 and 42. At the area 46, the solids may be picked up by lift gas from inlet 47, and also from inlet 48, and lifted through the pipe 49. This lift gas may be ammonia, nitrogen, or other gas, whereby the above described flushing and stripping action may be obtained. The sequence of steps in the area 50 and beyond is substantially the same as described.

Any desired portion of the pipe 40 may be subjected to irradiation, or even the entire length of the pipe.

Besides solids in powdered form, other fluidizable forms are useful, such as granules, beads, and the like. Beads for example may provide additional space for ammonia flow.

Flushing, stripping, and/or extracting agents which may be used in the separation procedures for removing adsorbed hydrazine from the solids include both gaseous and liquid agents, and acidic, basic, and neutral agents. Generally, basic agents, being chemically similar to the hydrazine in respect of basicity, tend to be solvents for it, while acidic agents may tend to extract the hydrazine by forming an acid addition product therewith. Thus, gaseous ammonia dissolves the hydrazine, while dilute hydrochloric acid solution forms an acid addition compound with it from which the hydrazine may be recovered by neutralization. Other acidic agents are dilute aqueous solutions of mineral acids like sulfuric, phosphoric, and nitric, and the like, and gaseous agents like carbon dioxide and hydrogen sulfide. Basic agents may also include hydroxylamine and ammonium hydroxide. More or less neutral extracting agents include water and low molecular weight alcohols like methanol and ethanol. Still other flushing gases are nitrogen, hydrogen, other monatomic gases, methane, steam, flue gas, natural gas, etc. These latter also suitable where the solid material comprises a zeolite, as the molecular dimensions of the gas permit it to enter the pores of the zeolite to thereby displace absorbed hydrazine. It may also be desirable to heat the flushing gas to some extent when using zeolites. As will be appreciated, the use of water and other aqueous agents will result in aqueous solutions of the hydrazine rather than the anhydrous material.

Some of the foregoing gaseous stripping agents may also be useful as the lift gas in pipe 49 of FIG. 4.

The invention may be illustrated by the following examples.

*Example 1*

Ammonia gas was irradiated in a cell resembling the system of FIG. 1 except that the solids were not rotated but stationary, and the electron beam was unscanned. The cell comprised a hollow metal cylinder having an open top which was covered by a thin aluminum disk. About a half inch below the top a 200-mesh circular stainless steel screen was fixedly disposed on which rested the bed of microporous solids of several millimeters thickness and about 1¾ inches diameter, the solids being in the direct line of the electron beam from a Van de Graaff accelerator disposed above the cell. The gas was admitted to the space between the cell top and the solids and passed downwardly in the cylinder through the solids. The electron beam was approximately circular in cross section and had a diameter, on the solid bed, of about 1 inch. Upon leaving the cell, the gas passed through a cold trap comprising a condensation zone cooled by a mixture of solid carbon dioxide and acetone, and then through a 50 cc. capacity, calibrated, water-displacement type gas collection system. The cell was charged with 16.8 grams of silica gel of 28 to 200 mesh previously dried at 540° C. The entire system was flushed with ammonia until free of air and then a flow rate of 11 cc. per minute of ammonia was established. The accelerator had been previously voltage conditioned and preset at 1 mev. to deliver 10 microamperes of current ($3.744 \times 10^{21}$ ev./min.) to the irradiation zone, these conditions being used in all the experiments. It was turned on, and an immediate vigorous evolution of gas (primarily nitrogen and hydrogen) ensued, surpassing the 50 cc. capacity of the gas collection system in about 10 to 15 minutes. The experiment was continued for a total period of 45 minutes, after which it was terminated and the silica gel removed from the cell. Upon extraction with dilute hydrochloric acid, a yield of hydrazine was produced amounting to 15 micrograms or a rate of 20 micrograms per hour.

*Example 2*

An experiment similar to the preceding one was carried out, except that a larger gas collection system was used and the accelerator was operated intermittently over a period of about 150.3 minutes. As in the case of Example 1, the thickness of the bed of solids was somewhat greater than the penetration therein of the beam. Approximately 425 cc. of gas were evolved in bursts of 50 cc. over short periods of time varying from 1.5 to 21 minutes. Extraction of the microporous solid gave 165 micrograms of hydrazine or an average production rate of 66 micrograms per hour. The intermittent or pulsed operation enabled the solid to cool, to be flushed, and to adsorb ammonia between periods of applied radiation, an effect which made itself apparent in a substantial increase in yield, as well as in greater gas evolution. It was also noted that hydrazine tended to collect in the lower portion of the solids at a position just beyond the range of the beam, the amount thus collected being about ten times that found elsewhere in the bed.

*Example 3*

Another experiment corresponding to Example 1 was run except that the solid material comprised 14.3 grams of silica-alumina of 60 to 200 mesh which had been dried at 550° C. The time of irradiation was 45 minutes. Extraction of the solid yielded 60 micrograms of hydrazine or an average production rate of 80 micrograms per hour. About 25 cc. of gas were evolved.

*Example 4*

The experiment of Example 1 was repeated except that 16.5 grams of silica-magnesia of 60 to 200 mesh, dried at 550° C., was used as the solid material. Gas evolution was quite rapid initially, 50 cc. being evolved in the first three minutes of operation. Final gas production at the end of a 45-minute run was was 130 cc. By percolating an aqueous solution of 1 M hydrochloric acid through the solids, a total of 85 micrograms of hydrazine was removed, corresponding to a rate of 113 micrograms per hour.

*Example 5*

In this instance, commercial bauxite of low silica content was used as the microporous solid. The bauxite was ground to 50 to 100 mesh and dried at 550° C. for 16 hours. About 20.4 grams of this material was used in the irradiation cell of Example 1 as described there. At the end of 45 minutes of operation, about 15 cc. of gas had evolved. Extraction of the solids yielded 20 micrograms of hydrazine, or a rate of 27 micrograms per hour.

*Example 6*

In an experiment again similar to Example 1, 10.6 grams of eta alumina was placed in the irradiation cell and the experiment conducted for about 45 minutes at an ammonia flow rate of 11 cc. per minute. Steady gas evolution was encountered throughout the run and amounted to a total of 37 cc. Extraction of the solid with 1 M hydrochloric acid solution produced 500 micrograms of hydrazine, corresponding to a rate of 667 micrograms per hour.

*Example 7*

In another run according to Example 1, the cell was charged with 8.4 grams of magnesium oxide. An increased ammonia flow rate of 125 cc. per minute was established for flushing and continued for the experiment. The accelerator was operated for 45 minutes so as to bombard the solid at 1 mev. and 10 microamperes. The ammonia was allowed to flow through the system for an additional 1.5 hours. The yield of hydrazine was 10 micrograms, this material being found in the cold trap, and 10 additional micrograms were found on the solid. The total production rate was 27 micrograms per hour. Gas evolution was 11 cc.

*Example 8*

The irradiation cell was again charged with 8.4 grams of magnesium oxide, as in the preceding experiment. With the ammonia flow rate at 125 cc. per minute, the accelerator was operated for two hours to bombard the solids at 1 mev. and 10 microamperes. After shutting off the accelerator, the cold trap was analyzed and showed about 5 micrograms of hydrazine. Flushing the solids for 15 hours yielded 53 additional micrograms of hydrazine. Then the solids were extracted twice with distilled water to give an additional yield of 30 micrograms of product, making a total yield of 88 micrograms or a production rate of 28 micrograms per hour. The total gas evolution was 68 cc.

Of further interest in this connection is an experiment that was run using a ground commercial alumina-platinum hydrogenation catalyst. This material was first treated in a stream of hydrogen (30 cc./min.) at 260° C. for 1.25 hours and then at 400° C. for 0.66 hour in order to reduce any platinum oxide to the metal and remove any occluded water, giving a solid containing about 0.6% of platinum. Using 18.3 grams of this material as the solid on the screen in the irradiation cell, and otherwise following the procedure of Example 1, except that the experiment ran for 90 minutes, no hydrazine was found, either in the cold trap or on the solids. The gas evolution was about 25 cc. On repeating this experiment, but using 21 grams of solid that had been sieved (50 to 200 mesh), a small amount of hydrazine, less than 10 micrograms per hour, was obtained from the solid together with about 15 cc. of gas after 45 minutes of irradiation. About 10 micrograms per hour of hydrazine and 8 cc. of gas were formed when the solids were omitted, the run being otherwise patterned after Example 1.

Some properties of the solids used in the foregoing examples are set forth in the table below.

TABLE.—PROPERTIES OF SOLIDS

| | Surface Area, sq. m./gm. | Particle Density, gm./ml. | Pore Volume, ml./gm. | Real Density, gm./ml. | Chemical Analysis |
|---|---|---|---|---|---|
| Silica gel | 634 | 1.32 | 0.314 | 2.25 | 100% Silica. |
| Silica-alumina | 405 | 1.13 | 0.455 | 2.30 | 90% Silica, 10% Alumina. |
| Silica-magnesia | 483 | 1.27 | 0.370 | 2.38 | 73.8% Silica, 26.2% Magnesia. |
| Low silica bauxite | 210 | 0.857 | | | 88% Alumina, 7% Silica, 1.5% Ferric Oxide, 2.5% Titania, 1.0% Insol. |
| Eta alumina | 372 | 1.06 | 0.628 | 3.19 | 100% Alumina except 0.1% Chloride, few p.p.m. Mercury. |
| Platinum-alumina | 425 | 1.24 | 0.48 | 3.06 | 0.6% Platinum, Bal. Alumina. |
| Magnesium oxide | 13 | 0.64 | 1.256 | 3.34 | 100% Magnesia. |

As the examples may illustrate, the use of machine-produced radiation provides a convenient and efficient means for irradiating. The radiation may be varied from that of a beam of approximately circular cross section to a scanned beam of slot-like and variable cross section and of increased uniformity of intensity. As demonstrated by Example 2, pulsed or intermittent radiation is possible, with advantages described, and with this method of operation the depth of solids, particularly with respect to FIG. 1, may be increased to exceed the penetration of the radiation so that the hydrazine may collect or diffuse to the non-irradiated portions of the solids where it is out of the range of destructive attack.

Where pulsed operation is not employed, the depth of solids may correspond to the penetration of the radiation, so as to absorb substantially all of it.

Larger solid particles, such as beads or granules of a size up to 4 to 10 mesh, may be used in the method of FIG. 1 as well as of FIG. 4.

It will be understood that the invention is capable of obvious variations without departing from its scope.

In the light of the foregoing descriptions, the following is claimed.

1. Method of forming hydrazine from gaseous ammonia which comprises flowing a stream of gaseous ammonia into contact with a thin layer of porous solids in a confined irradiation zone, applying a beam of high energy ionizing radiation to a restricted area of said layer while flowing the ammonia in contact with said area, moving successive portions of said layer into and out of the path of said beam in the presence of said ammonia, thereby coincidently irradiating the ammonia and said solids while the same are in contact with each other, absorbing a portion of the radiation in the ammonia to form hydrazine, absorbing another and larger portion of the radiation in said solids, whereby energy is applied to the solids and transferred at least in part to the ammonia to form hydrazine, utilizing at least a portion of the ammonia stream to continuously and rapidly flush said solids in said confined zone to remove any adsorbed hydrazine, passing said stream through said layer into a collection chamber beneath the layer and out of range of said radiation, then removing said stream from said zone.

2. Method of claim 1 wherein said beam of radiation is intermittently turned off and on.

3. Method of claim 1 wherein said beam of radiation is intermittently turned off and on, and wherein the depth of said layer of solids is greater than the penetration of said radiation so as to provide a volume of solids in which hydrazine may collect beyond the range of radiation.

4. Method of forming hydrazine from gaseous ammonia which comprises flowing gaseous ammonia into contact with a thin layer of porous solids in a confined irradiation zone, applying high energy ionizing radiation to a restricted area of said layer while flowing the ammonia in contact with said area, moving successive portions of said layer into and out of the path of said radiation in the presence of said ammonia, thereby coincidently irradiating the ammonia and said solids while the same are in contact with each other, utilizing at least a portion of the ammonia stream to continuously and rapidly flush said solids, and then removing unconverted ammonia and hydrazine from said zone.

5. Method of claim 4 wherein the depth of said layer of solids is just enough to substantially completely absorb the radiation.

6. Method of claim 4 wherein the depth of said layer of solids is more than enough to absorb said radiation, thereby to provide a volume of solids for receiving and absorbing hydrazine at a position beyond the range of said radiation.

7. Method of forming hydrazine from gaseous ammonia which comprises flowing a stream of gaseous ammonia in contact with a stream of fluidized solids in an irradiation zone, irradiating the ammonia and solids while in contact with each other in said zone with high energy ionizing radiation, absorbing a portion of the radiation in the ammonia to form hydrazine, absorbing another and larger portion of the radiation in said solids, whereby energy is applied to the solids and transferred at least in part to the ammonia to form hydrazine, flowing the solids out of said zone to a stripping zone and stripping the same with a stripping gas, separating the solids from said gas, and returning the stripped solids to the inlet of said irradiation zone.

8. Method of claim 7 in which an ammonia gas stream is employed to fluidize the solids in the irradiation zone.

9. Method of claim 7 in which said ammonia gas flows countercurrently to the solids.

10. Method of claim 7 in which the gaseous ammonia stream and the fluidized solids flow cocurrently in the irradiation zone.

11. Method of claim 7 in which an inert gas is employed to fluidize the solids.

12. Method of forming hydrazine from gaseous ammonia which comprises flowing a stream of gaseous ammonia in contact with a countercurrently flowing stream of fluidized solids in an irradiation zone, irradiating the ammonia and solids while in contact with each other in said zone with high energy ionizing radiation, absorbing a portion of the radiation in the ammonia to form hydrazine, absorbing another and larger portion of the radiation in said solids, whereby energy is applied to the solids and transferred at least in part to the ammonia to form hydrazine, flowing the irradiated ammonia stream out of said zone to a hydrazine recovery zone, transferring the fluidized solids to a stripping zone adjacent the irradiation zone and stripping the same with a stripping gas, separating and passing the stripping gas to said recovery zone, and returning the stripped solids to the inlet of said irradiation zone.

13. Method of forming hydrazine from gaseous ammonia which comprises flowing a stream of gaseous ammonia in contact with a cocurrently flowing stream of fluidized solids in an irradiation zone, irradiating the ammonia and solids while in contact with each other in said zone with high energy ionizing radiation, absorbing a portion of the radiation in the ammonia to form hydrazine, absorbing another and larger portion of the radiation in said solids, whereby energy is applied to the solids and transferred at least in part to the ammonia to form hydrazine, flowing the irradiated cocurrent ammonia and solids stream out of said zone to a stripping zone adjacent the irradiation zone and stripping the same with a stripping gas, separating and passing the stripping gas and said irradiated ammonia to a hydrazine recovery zone, and returning the stripped solids to the inlet of said irradiation zone.

14. Method of forming hydrazine from gaseous ammonia which comprises flowing a stream of gaseous ammonia into contact with a porous solid in an irradiation zone, irradiating the ammonia while in contact with said solid with high energy ionizing radiation, absorbing a portion of the radiation in the ammonia to convert the same to hydrazine, absorbing another and larger portion of the radiation in said solid, whereby energy is applied therein and transferred at least in part to the ammonia to form hydrazine, removing the irradiated stream from said zone to recover hydrazine, and extracting said solid with a hydrazine-removing agent.

15. Method of forming hydrazine from gaseous ammonia which comprises flowing gaseous ammonia into contact with a porous solid in an irradiation zone, irridiating the ammonia while in contact with said solid with high energy ionizing radiation, absorbing a portion of the radiation in the ammonia to convert the same to hydrazine, absorbing another and larger portion of the radiation in said solid, whereby energy is applied therein and transferred at least in part to the ammonia to form hydrazine.

16. Method of claim 15 wherein said solid is a porous oxide.

17. Method of claim 15 wherein said solid is a basic porous oxide.

18. Method of claim 15 wherein said solid is a hydrogen-attracting material.

References Cited

UNITED STATES PATENTS

| | | | |
|---|---|---|---|
| 2,736,694 | 2/1956 | Gunning et al. | 204—157.1 |
| 2,928,780 | 3/1960 | Harteck et al. | 204—157.1 |
| 3,265,602 | 7/1966 | Steinberg et al. | 204—157.1 |

HOWARD S. WILLIAMS, *Primary Examiner.*